United States Patent
Dinh et al.

(10) Patent No.: US 11,438,353 B2
(45) Date of Patent: Sep. 6, 2022

(54) APPLICATION PROGRAMMING INTERFACE PLATFORM MANAGEMENT USING MACHINE LEARNING

(71) Applicant: Dell Products L.P., Round Rock, TX (US)

(72) Inventors: Hung Dinh, Austin, TX (US); Matthew Christopher Frank, Round Rock, TX (US); Sabu K. Syed, Austin, TX (US); Manikandan Rathinavelu, Cedar Park, TX (US); Panguluru Vijaya Sekhar, Bangalore (IN); Muhammed R. Mohiuddin, Cedar Park, TX (US); Kannappan Ramu, Frisco, TX (US)

(73) Assignee: Dell Products L.P., Round Rock, TX (US)

(*) Notice: Subject to any disclaimer, the term of this patent is extended or adjusted under 35 U.S.C. 154(b) by 360 days.

(21) Appl. No.: 16/669,995

(22) Filed: Oct. 31, 2019

(65) Prior Publication Data
US 2021/0136095 A1     May 6, 2021

(51) Int. Cl.
*H04L 9/40*     (2022.01)
*G06N 5/04*     (2006.01)
*G06N 20/00*    (2019.01)

(52) U.S. Cl.
CPC .......... *H04L 63/1425* (2013.01); *G06N 5/04* (2013.01); *G06N 20/00* (2019.01); *H04L 63/1458* (2013.01); *H04L 2463/141* (2013.01)

(58) Field of Classification Search
CPC ............ H04L 63/1425; H04L 63/1458; H04L 2463/141; G06N 5/04; G06N 5/003; G06N 20/00; G06N 20/20
See application file for complete search history.

(56) References Cited

U.S. PATENT DOCUMENTS

| | | | |
|---|---|---|---|
| 7,357,301 B1* | 4/2008 | Bajpay | G06Q 10/10 235/376 |
| 2012/0192016 A1* | 7/2012 | Gotesdyner | H04L 12/6418 714/E11.179 |

(Continued)

FOREIGN PATENT DOCUMENTS

WO    WO-2012114215 A1 *   8/2012   .............. G06N 5/04

OTHER PUBLICATIONS

Deshmukh RV, Devadkar KK. Understanding DDoS attack & its effect in cloud environment. Procedia Computer Science. Jan. 1, 2015; 49:202-10. (Year: 2015).*

(Continued)

*Primary Examiner* — Robert B Leung
(74) *Attorney, Agent, or Firm* — Ryan, Mason & Lewis, LLP (57) ABSTRACT

A method includes monitoring and logging a plurality of transactions between one or more clients and an application programming interface gateway, and analyzing data corresponding to the plurality of transactions using one or more machine learning techniques. The method further includes determining, based on the analyzing, one or more issues corresponding to one or more application programming interfaces associated with the application programming interface gateway and resulting from one or more of the plurality of transactions. In the method, one or more corrective actions are performed to address the one or more issues.

20 Claims, 8 Drawing Sheets

(56) References Cited

U.S. PATENT DOCUMENTS

| | | | | |
|---|---|---|---|---|
| 2015/0269377 | A1* | 9/2015 | Gaddipati | G06F 21/44 726/30 |
| 2017/0237729 | A1* | 8/2017 | Uppalapati | H04L 63/20 726/8 |
| 2017/0289307 | A1* | 10/2017 | Thompson | H04L 67/327 |
| 2018/0288091 | A1* | 10/2018 | Doron | H04L 63/0227 |
| 2019/0102536 | A1* | 4/2019 | Chopra | G06F 9/547 |
| 2020/0117523 | A1* | 4/2020 | Morrison | G06F 9/547 |
| 2020/0120122 | A1* | 4/2020 | Du | H04L 63/1416 |

OTHER PUBLICATIONS

R. Fielding, J. Reschke. Hypertext Transfer Protocol (HTTP/1.1): Semantics and Content. Request for Comments: 7231. Jun. 2014. (Year: 2014).* airbrake.io, "401 Unauthorized Error: What it is and How to Fix it," https://airbrake.io/blog/http-errors/401-unauthorized-error, Nov. 16, 2017, 5 pages.

Wikipedia, "API Management," https://en.wikipedia.org/wiki/API_management, Sep. 5, 2019, 3 pages.

CA Technologies, "Full Lifecycle API Management and Microservices," https://www.ca.com/us/products/apim.html, 2019, 11 pages.

Wikipedia, "Application Programming Interface," https://en.wikipedia.org/wiki/Application_programming_interface, Oct. 1, 2019, 9 pages.

Boomi, "Business Outcomes, Accelerated," https://boomi.com/?utm_source=google&utm_medium=cpc&utm_content=dell boomi-phrase&utm_campaign=G_Brand_NA_Search&src=web&-gclid . . . , 2019, 8 pages.

NGINX, "Building Microservices Using an API Gateway," https://www.nginx.com/blog/building-microservices-using-an-api-gateway/, downloaded Oct. 1, 2019, 16 pages.

Rachel Yordán, "Covering your Assets: Data Encryption in API Management," www.apiman.io/blog/security/gateway/2016/04/13/data-encryption.html, Apr. 13, 2016, 5 pages.

Michael Wittig, "Customized Rate Limiting for API Gateway by Path Parameter, Query Parameter, and More," https://cloudonaut.io/customized-rate-limiting-for-api-gateway-by-path-parameter-query-parameter-and-more/, Oct. 17, 2018, 8 pages.

J. Simpson, "Everything You Need to Know About API Rate Limiting," https://nordicapis.com/everything-you-need-to-know-about-api-rate-limiting/, Apr. 18, 2018, 13 pages.

developer.twitter.com, "Basics," https://developer.twitter.com/en/docs/basics/rate-limiting, 2019, 7 pages.

Wikipedia, "Splunk," https://en.m.wikipedia.org/wiki/Splunk, downloaded Oct. 1, 2019, 13 pages.

CA Technologies, "Unifying Security Across Web, APIs and Mobile—API Security with CA API Gateway and CA Single Sign-On," CA Technologies, 2014, 2 pages.

Westhost, "What is a 500 Error," https://www.westhost.com/knowledgebase/display/WES/What+Is+A+500+error, downloaded Oct. 2, 2019, 2 pages.

Cloudflare, "What is a Distributed Denial-of-Service (DDoS) Attack?" https://www.cloudflare.com/learning/ddos/what-is-a-ddos-attack/, 2019, 19 pages.

whatis.com, "What is API Gateway?" https://whatis.techtarget.com/definition/API-gateway-application-programming-interface-gateway, Aug. 2018, 4 pages.

whatis.com, "What is Brute Force Attack?" https://searchsecurity.techtarget.com/definition/brute-force-cracking, Jan. 2019, 5 pages.

* cited by examiner

```
from sklearn.ensemble import IsolationForest
clf=IsolationForest(n_estimators=80, max_samples=       ,  \
                    max_features=1.0, bootstrap=False, n_jobs=-1,
                    random_state=45, verbose=0)

clf.fit(metrics_df[to_model_columns])
IsolationForest(behaviour=       , bootstrap=False, contamination=
      max_features=1.0, max_samples=       , n_estimators=80, n_jobs=-1,
      random_state=45, verbose=0)
```

APPLICATION PROGRAMMING INTERFACE PLATFORM MANAGEMENT USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to utilizing machine learning in connection with control and management of application programming interface (API) platforms.

BACKGROUND

API gateways are implemented to securely manage and expose APIs to users. Protecting and controlling access to APIs on a given platform on which an API gateway is implemented is paramount to ensuring stability for the platform and API availability.

In order to effectively manage use of and access to APIs, and protect APIs from unwanted attacks, API providers need to understand how API use varies over different time periods, and apply that understanding to address failures and/or errors prior to their occurrence.

Accordingly, techniques are needed for identifying API use patterns and utilizing the identified patterns to accurately determine what actions to take based on collected use data and/or identified anomalies, failures and errors.

SUMMARY

Illustrative embodiments provide techniques for enhancing API platform protection through machine learning. Embodiments advantageously protect API platforms from unexpected failures and external attacks, and provide new techniques for abnormality identification using machine learning models, so that issues are recognized and remedied prior to occurrence and before enterprises are impacted.

In one embodiment, a method comprises monitoring and logging a plurality of transactions between one or more clients and an application programming interface gateway, and analyzing data corresponding to the plurality of transactions using one or more machine learning techniques. The method further includes determining, based on the analyzing, one or more issues corresponding to one or more application programming interfaces associated with the application programming interface gateway and resulting from one or more of the plurality of transactions. In the method, one or more corrective actions are performed to address the one or more issues.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" refers to a set of subroutine definitions, protocols, and/or tools for building software. Generally, an API defines communication between software components. APIs permit programmers to write software applications consistent with an operating environment or website.

As used herein, an "API gateway" refers to programming that is a single entry point into a system with a plurality of applications or micorservices having multiple distinct APIs. Requests from client devices are routed through an API gateway before being transmitted to the appropriate application or microservice. An API gateway provides protocol translations to facilitate the interfacing of client devices with applications corresponding to different API protocols.

Figure 1:
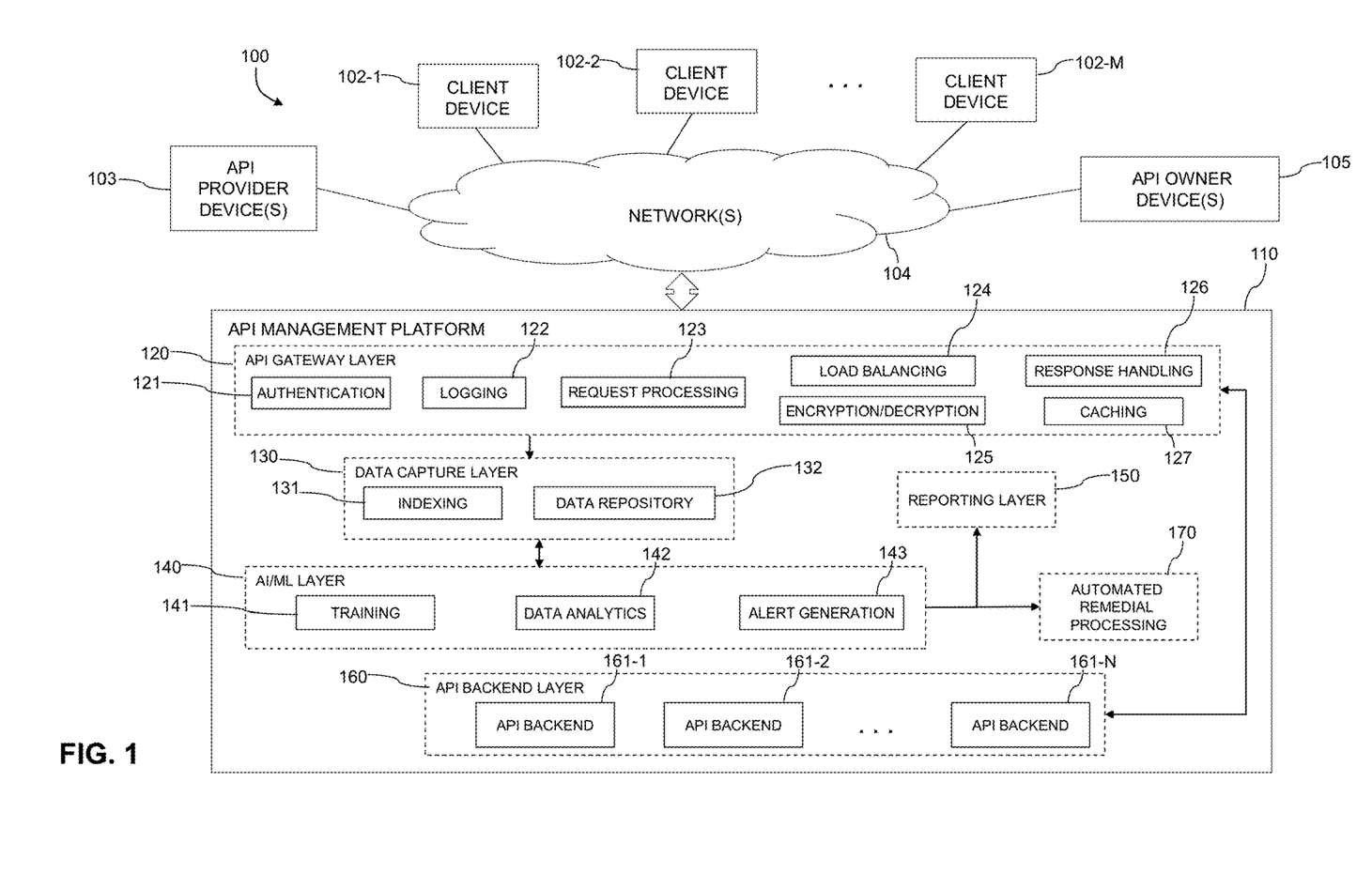
FIG. 1 is a block diagram of an information processing system comprising an API management platform configured for utilizing machine learning to predict API use patterns and identify abnormalities in an illustrative embodiment.

FIG. 1 shows an information processing system 100 configured in accordance with an illustrative embodiment. The information processing system 100 comprises client devices 102-1, 102-2, . . . 102-M (collectively "client devices 102"). The information processing system 100 further comprises one or more API provider devices 103 and one or more API owner devices 105. The client devices 102, API provider devices 103 and API owner devices 105 communicate over a network 104 with an API management platform 110.

The client devices 102, API provider devices 103 and API owner devices 105 can comprise, for example, Internet of Things (IoT) devices, desktop, laptop or tablet computers, mobile telephones, or other types of processing devices capable of communicating with the API management platform 110 over the network 104. Such devices are examples of what are more generally referred to herein as "processing devices." Some of these processing devices are also generally referred to herein as "computers." The client devices 102, API provider devices 103 and API owner devices 105 may also or alternately comprise virtualized computing resources, such as virtual machines (VMs), containers, etc. The client devices 102, API provider devices 103 and API owner devices 105 in some embodiments comprise respective computers associated with a particular company, organization or other enterprise. The variable M and other similar index variables herein such as K, L and N are assumed to be arbitrary positive integers greater than or equal to two.

The terms "client", "provider", "owner" or "user" herein are intended to be broadly construed so as to encompass numerous arrangements of human, hardware, software or firmware entities, as well as combinations of such entities. API management services may be provided for users utilizing one or more machine learning models, although it is to be appreciated that other types of infrastructure arrangements could be used. At least a portion of the available services and functionalities provided by the API management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the API management platform 110, as well as to support communication between the API management platform 110 and connected devices (e.g., client devices 102, API provider devices 103 and API owner devices 105) and/or other related systems and devices not explicitly shown.

In some embodiments, the client devices 102, API provider devices 103 and API owner devices 105 are assumed to be associated with repair technicians, system administrators, information technology (IT) managers, software developers or other authorized personnel configured to access and utilize the API management platform 110.

The API management platform 110 in the present embodiment is assumed to be accessible to the client devices 102, API provider devices 103 and API owner devices 105 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The API management platform 110, on behalf of respective infrastructure tenants each corresponding to one or more users associated with respective ones of the client devices 102, API provider devices 103 and application owner devices 105, provides a platform for the protection of API gateways through machine learning. According to embodiments, the API management platform 110 is an intelligent system for protecting API platforms from unexpected failures and external attacks. In addition, in order to provide for warnings and remedial actions in advance of failures and/or attacks that can impact an enterprise, the API management platform 110 is configured for adding abnormality and trend observations to machine learning models designed to predict such failures and/or attacks.

Referring to FIG. 1, the API management platform 110 includes an API gateway layer 120, a data capture layer 130, an artificial intelligence/machine learning (AI/ML) layer 140, a reporting layer 150, API backend layer 160, and an automated remedial processing layer 170.

The API gateway layer 120 includes an authentication component 121, a logging component 122, a request processing component 123, a load balancing component 124, an encryption/decryption component 125, a response handling component 126 and a caching component 127. Requests from client devices 102, such as, for example, API calls, go through the API gateway layer 120, which is configured to provide APIs tailored to each of the client devices 102. In an operational diagram, FIG. 2 illustrates a call to an API transmitted from a client device 202 to a gateway layer 220 (arrow 1).

The authentication component 121 along with the request processing component 123 handles client requests for APIs and services. The authentication component 121 controls access to the APIs and services using, for example, token-based authentication and authorization techniques and standards, including, but not necessarily limited to, OAuth (Open Authorization). The authentication component 121 integrates with various identity and access management (IAM) systems to control user access to APIs and services. The authentication component 121 can include functionality for token validation and administrative token management, and may be configured to implement throttling policies, while the request processing component 123 passes requests for backend services to the API backend layer 160.

Figure 2:
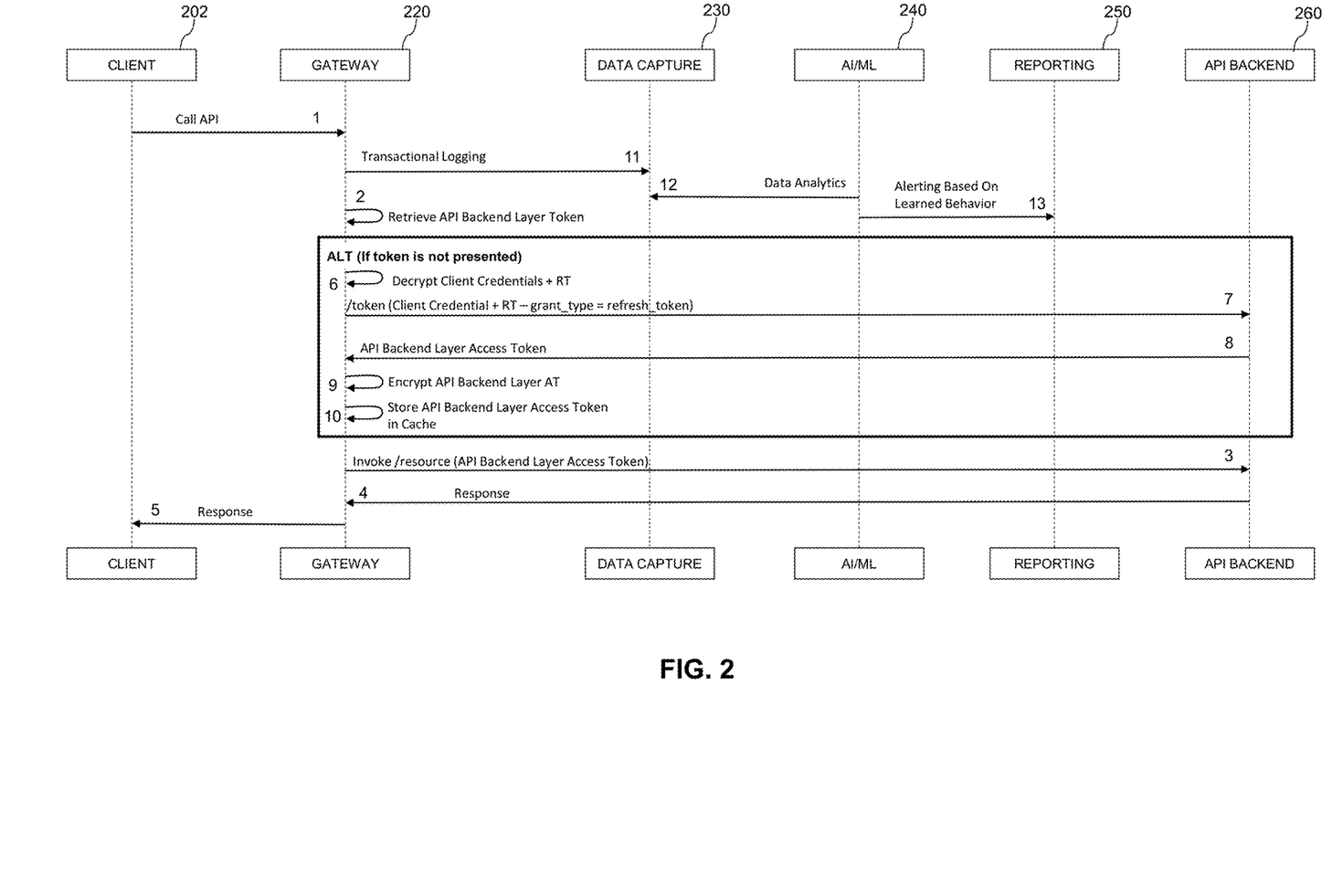
FIG. 2 is an operational diagram of an API management platform configured for utilizing machine learning to predict API use patterns and identify abnormalities in an illustrative embodiment.

Referring to FIGS. 1 and 2, the authentication component 121 can be configured to perform functions such as retrieving an API backend layer token from a cache (arrow 2). Using the API backend layer token, one or more resources can be invoked from an API backend layer 160/260 (arrow 3) and a response including the requested resource is received from an API backend layer 160/260 at the API gateway 120/220 (arrow 4) and transmitted to the client device 102/202 (arrow 5). A cached API backend layer token can be encrypted and decrypted by an encryption/decryption component (e.g., component 125) and stored by a caching component (e.g., component 127) of an API gateway layer 120/220. A response handling component (e.g., component 126) processes responses to client requests for APIs and services (e.g., arrows 4 and 5) received from an API backend layer 160/260.

Referring to the ALT box in FIG. 2, if a token is not presented, the authentication component (e.g., component 121) of an API gateway layer 120/220 causes a decryption/encryption component (e.g., component 125) to decrypt client credentials (arrow 6) stored by, for example, a caching component (e.g., component 127). A request is then made for a refresh token to the token endpoint (/token) in the API backend layer 160/260 with the decrypted client credentials (grant_type=refresh_token) (arrow 7). A request tracker (RT) is sent with the request to the token endpoint. The response from the API backend layer 160/260 is a new access token (arrow 8), which is encrypted by the encryption/decryption component (e.g., component 125) (arrow 9) and stored by the caching component (e.g., component 127) (arrow 10). Using the new access token, one or more resources can be invoked from an API backend layer 160/260 (arrow 3).

According to one or more embodiments, the API gateway layer 120 implements functionality for different security protocols which provide, for example, access control on the Internet, and for cloud services and mobile applications, firewall configurations, and device and/or user authentication. Protocols implemented by the API gateway layer 120 may include, for example, Layer 7, OAuth, DIAS, and Kerberos.

The logging component 122 collects analytics data and logs API events, such as, for example, each time an API operation is invoked. An API event record can include information such as, but not necessarily limited to, invocation logs, and logs of activities, headers and payloads. Types of content to be logged may be pre-defined by, for example, a developer. Referring to FIGS. 1 and 2, the API event data from a logging component (e.g., component 122) of an API gateway layer 120/220 is provided to a data capture layer 130/230 (arrow 11), which captures, indexes, and correlates data (e.g., real-time data) in a searchable repository (e.g., data repository 132) for use by the AI/ML, layer 140/240 to perform data analytics to determine trends and make predictions regarding potential errors or failures associated with the API management platform 110. The results of the data analytics are provided to the data capture layer 130/230 (arrow 12) for indexing by an indexing component (e.g., component 131) and storage in a data repository (e.g., repository 132).

The data repository 132 in some embodiments is implemented using one or more storage systems or devices associated with the API management platform 110. In some embodiments, one or more of the storage systems utilized to implement the data repository comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The data analytics may trigger an alert process, whereby the results of the data analytics are provided to a reporting layer 150/250 (arrow 13). As described in more detail herein, the reporting layer 150/250 is configured to transmit a message to a client, API provider and/or API owner (e.g., via a client device 102, an API provider device 103 or an API owner device 105) indicating an issue with the API management platform 110 and/or with one or more of the APIs managed by the API management platform 110. The reporting layer 150/250 can also be configured to generate a service ticket corresponding to the issue, and transmit the service ticket to an API provider and/or API owner associated with the issue (e.g., via an API provider device 103 or an API owner device 105). Upon receipt of the service ticket, the API provider and/or API owner can take action to remedy the issue.

The load balancing component 124 monitors a request load (e.g., client API calls) sent by the load balancing component 124 to different nodes of a particular service. According to an embodiment, the load balancing component 124 balances load between the different nodes of a particular service.

The encryption/decryption component 125 encrypts sensitive data stored on the API management platform 110 and decrypts the data when needed at runtime and/or when publishing services. Data that is encrypted and decrypted can include, for example, tokens and credentials used when publishing an API and/or making authenticated calls to the API gateway 120, including client credentials.

The AI/ML layer 140 includes a training component 141, a data analytics component 142 and an alert generation component 143. The AI/ML layer 140 is configured to perform data analytics to determine trends and make predictions regarding potential errors or failures associated with the API management platform 110. The AI/ML engine 140, in particular, the data analytics component 142, uses machine learning techniques to analyze one or more of a plurality of transactions over a given time period to determine one or more trends. The transactions include, for example, requests by the one or more clients to access APIs via the API management platform 110. The data analytics component 142 is also configured to predict one or more patterns over a future time period based on historical data. According to the embodiments, the machine learning techniques utilize, for example, isolation forest models, weighted moving average methods, artificial neural networks (ANNs), support vector machines (SVMs), K-means methods, decision trees, multilayer perceptrons, naïve Bayes classifiers, Bayesian networks and instance based learning.

For example, according to an embodiment, the AI/ML layer 140 is configured to perform anomaly prediction using an isolation forest model. The isolation forest model is used by the AI/ML layer 140 as a unique outlier detection technique to identify anomalies among normal observations. According to one or more embodiments, the isolation forest model uses a defined threshold value in a contamination parameter to identify the anomalies, and make predictions of potential failures of the API management platform in real-time. The contamination parameter varies based on datasets, as a range from about 1 to about 25%, as a threshold to identify the anomalies. By parsing historical data, real-time anomalies are predicted within a specified time interval. The isolation forest model can be scaled up to handle large, high-dimensional datasets.

Figure 3:
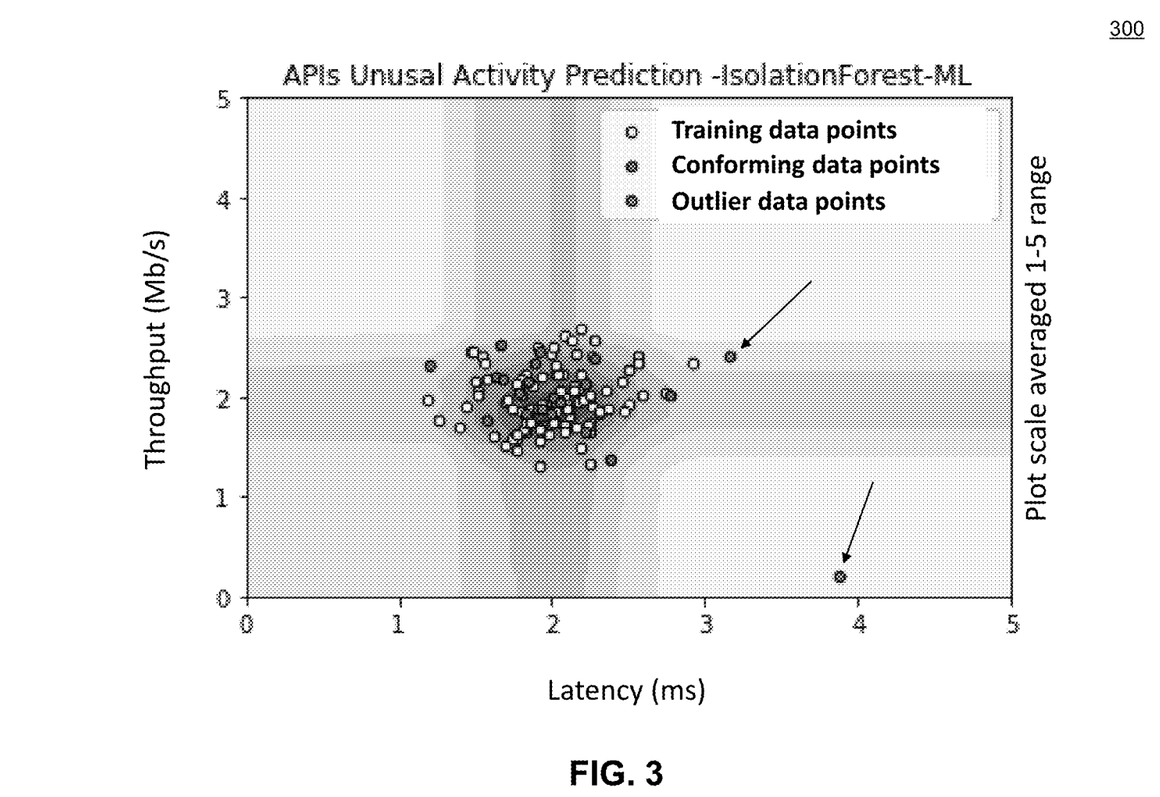
FIG. 3 is a graph illustrating anomaly prediction using an isolation forest model in an illustrative embodiment.

In the graph 300 in FIG. 3, the isolation forest model is used to predict unusual activity in terms of throughput (Mb/s) and latency (ms) for the analyzed transactions. The averaged plot scale noted in FIG. 3 refers to the average depth of an occurrence in the forest, which is composed of multiple isolation trees and uses the average depth as the anomalous score of the instance. The lower and higher score the instance has from the mean, the higher probability of the instance being an anomaly. The model includes training data points, conforming data points and outlier data points (identified by arrows in FIG. 3). The outlier data points identify abnormal transactions possibly indicating unexpected failures of and/or external attacks on the platform 110 or one or more of the components of the platform 110. Based on the results of the analysis and in the event of outlier detection, the alert generation component 143, in conjunction with the reporting layer 150/250, generates alerts for clients, API providers and/or API owners of potential failures and/or attacks before an enterprise is impacted.

Figure 4:
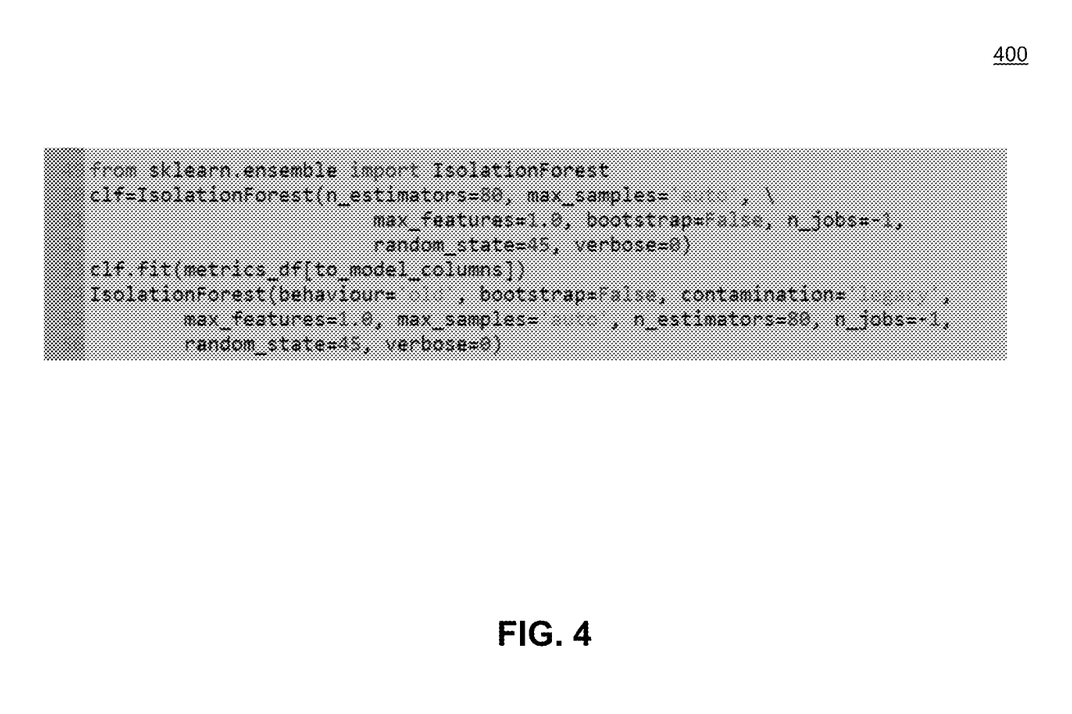
FIG. 4 depicts example pseudocode for implementing anomaly prediction using an isolation forest model in an illustrative embodiment.

The isolation forest model may be used by the AI/ML layer 140 in connection with determining a spike in errors that requires further investigation and/or corrective action. FIG. 4 depicts example pseudocode 400 for implementing anomaly prediction using an isolation forest model in an illustrative embodiment. Other machine learning methods, such as, for example, weighted moving average methods, K-means methods, decision trees, multilayer perceptrons, naïve Bayes classifiers, Bayesian networks and instance based learning can also be used to determine error spikes.

The determination of a spike in errors may be based on a number of errors in a given time period exceeding a threshold. The threshold may be defined by a developer, or learned based on an analysis of training data by a training component 141 of the AI/ML layer 140. In establishing the threshold, the training component 141 and/or a developer may allow for a certain number of errors to occur based on, for example, data issues, network problems, human error or other expected errors. The threshold may exceed the number of expected errors, and if the number of errors exceeds the threshold, the AI/ML layer 140 (e.g., data analytics component 142) may determine that an error spike has occurred.

The analyzed error types can include, but are not necessarily limited to, bad request errors (e.g., "400 Bad Request error") indicating that a request sent by a client or resource is incorrect (e.g., has invalid syntax) or is corrupted, and a server receiving the request could not decipher the request, unauthorized errors (e.g., "401 Unauthorized Error") indicating that a request sent by a client or resource could not be authenticated, and internal server errors (e.g., "500 Internal Server Error") indicating a "server-side" error. The AI/ML, layer 140 may determine based on a spike in errors, such as, for example, unauthorized errors, that a distributed denial of service (DDoS) attack and/or a brute force attack is occurring. A DDoS attack attempts to disrupt normal traffic of a targeted server, platform or network by overwhelming the target or its surrounding infrastructure with a flood of network traffic. A brute force attack refers to a trial and error attack by applications to decode encrypted data such as, for example, passwords or data encryption standard (DES) keys.

The alert generation component 143 transmits a notification to the reporting layer 150/250 of the error spikes and data corresponding to the error spikes. The reporting layer 150/250 generates alerts for clients, API providers and/or API owners of the errors. Additionally, the determination of and data corresponding to error spikes is transmitted to the automated remedial processing layer 170, which is configured to perform one or more automated remedial processes to eliminate certain types of errors. For example, in the case of identified internal server error or spike in internal server errors, the automated remedial processing layer 170 may execute a self-healing process to comprising tasks designed to diagnose and remove the internal server error(s).

The data analytics component 142 of the AI/ML layer 140 is further configured to use one or more machine learning techniques to determine whether a rate limit for a given API managed by the API management platform 110 will be exceeded. As used herein, "rate limit" or "rate limiting" refers to processing limits put on an API by, for example, API owners or providers. A rate limit refers to a limitation given to a client specifying a number of transactions on an API for a given time period. For example, processing corresponding to an API may be measured in transactions per second (TPS), and a client may have a specified number of transactions per second before exceeding its rate limit. Rate limits prevent an API from being overwhelmed by providing a limit on the number of requests, or the quantity of data clients can consume. In some situations, if a client reaches a rate limit, client connections may be throttled or terminated.

The time period associated with rate limiting can vary. For example, at the direction of an API owner or provider, the API management platform 110 and/or specific APIs on the API management platform 110 can limit the number of requests a client can make per second, day, week or month, etc. According to the embodiments, the data analytics component 142 of the AI/ML layer 140 is configured to determine client transaction trends over a given time period and generate a prediction regarding if or when a rate limit may be exceeded. For example, in connection with a rate limit based on a number of requests per week, month, quarter or other period of time, the data analytics component 142 predicts when a rate limit will be exceeded (e.g., in y days) based on client usage trends over an extended period (e.g., multiple days or weeks). The prediction may also specify how far in advance of a given rate limit the rate limit will be exceeded (e.g., a monthly rate limit will be exceeded by x days before the end of the month). According to other embodiments, the data analytics component 142 of the AI/ML layer 140 is configured to determine a daily client transaction trend, and generate a prediction regarding whether a daily rate limit threshold is going to be exceeded.

In the event of a determination that an API rate limit will be exceeded based on client usage trends over an extended period, or a determination that a daily rate limit threshold is going to be exceeded, the alert generation component 143 transmits a notification to the reporting layer 150/250 regarding the determination. The reporting layer 150/250 generates messages for API providers and/or API owners (e.g., via API provider or API devices 103, 105) that the rate limit is going to be exceeded. The alert may include an indication that the rate limit is going to be exceeded in a certain period of time (e.g., y days), how far in advance of a given rate limit the rate limit will be exceeded (e.g., a monthly rate limit will be exceeded by x days before the end of the month), or that a daily rate limit threshold is going to be exceeded. Upon receiving such alerts that the rate limit is going to be exceeded, the API providers and/or API owners may institute a plan to address the rate limit issue prior to the rate limit being exceeded and causing problems for the client(s). Such a plan may include, for example, changing (e.g., increasing) the rate limit for given client(s). Alternatively, if there is suspected fraudulent activity concluded from the rate limit data, such as a DDoS attack, API providers and/or owners may decrease the rate limits for suspected fraudulent users and/or deny such users API access.

Additionally, the determination that an API rate limit will be exceeded is transmitted to the automated remedial processing layer 170, which is configured to perform one or more automated remedial processes to address the rate limit being exceeded. For example, in the case of a determination that an API rate limit will be exceeded, the automated remedial processing layer 170 may scale up the platform to compensate for the transaction rate increase. This may occur, for example, during period of high demand, such as a holiday period. The automated remedial processing layer 170 can be configured to implement functionality for scaling, such as dynamic and/or predictive scaling of system resources to maintain high availability. Dynamic scaling creates scaling policies for resources, which adjust resource capacity in response to real-time changes in resource utilization. Predictive scaling relies on machine learning to analyze the historical workload of resources and forecasts load to generate scheduled scaling actions to ensure availability of resource capacity. Scaling can be based on metrics such as, for example, HTTP throughput, latency and memory.

Figure 5:
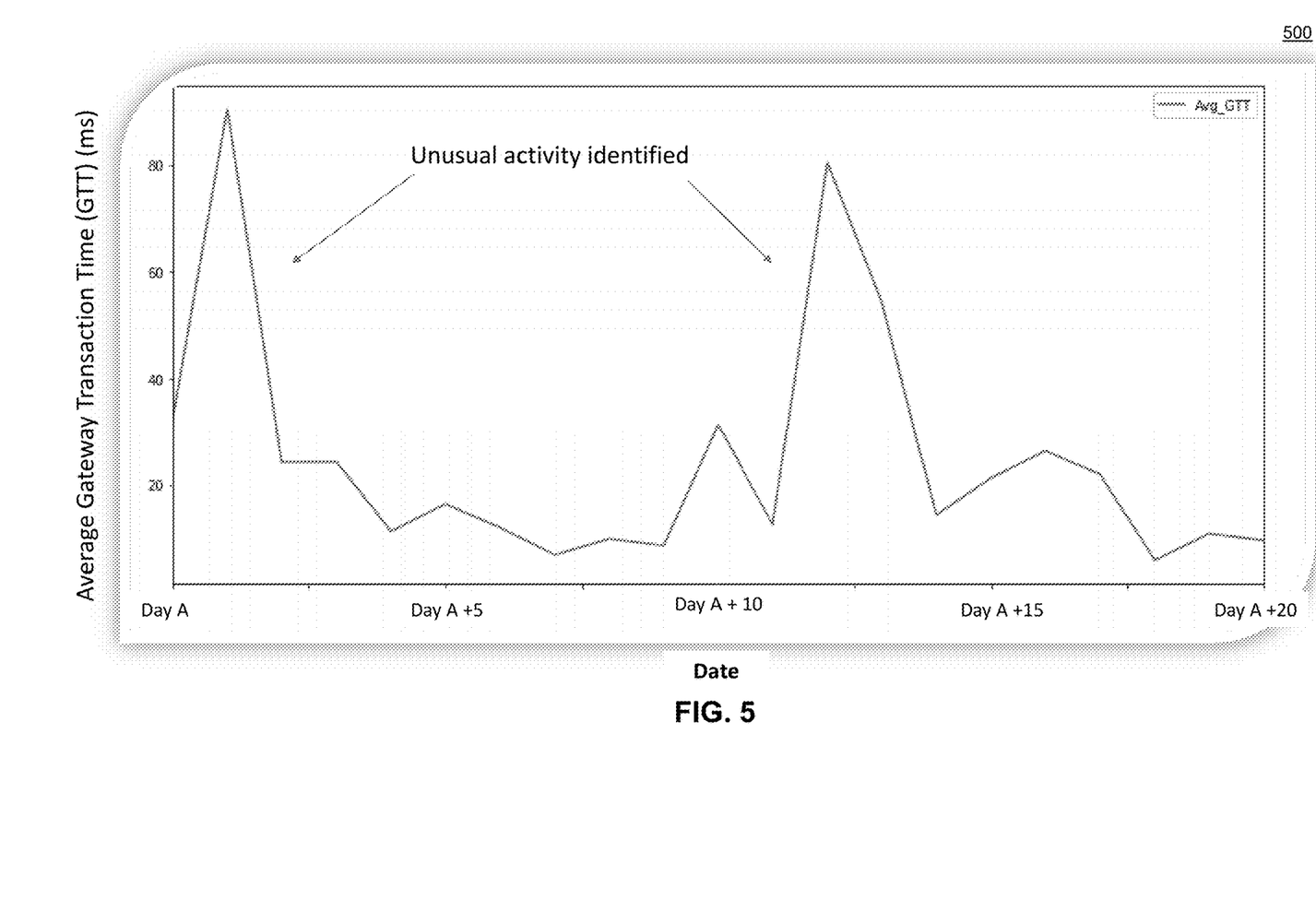
FIG. 5 is a graph illustrating time series prediction using a weighted moving average method in an illustrative embodiment.

The AI/ML layer 140 uses machine learning techniques, such as, for example, ANN, SVM, automatic threshold determination based on dynamic baseline(s), and timeseries forecasting to predict whether rate limits will be exceeded. FIG. 5 is a graph 500 illustrating time series prediction using a weighted moving average (WMA) method. The WMA method predicts one or more patterns over a future time period based on historical data. For example, the WMA method can be used by AI/ML layer 140 to predict patterns for the next r minutes/days/weeks/months, etc. based on historical data. In the example graph 500 in FIG. 5, average gateway transaction time (GTT) is plotted against dates in the future, starting from a first day (Day A) and adding to that date (e.g., Day A+5 days; Day A+10 days; Day A+15 days; Day A+20 days). In this case, as shown by the arrows in FIG. 5, the WMA method predicts anomalies in GTT between Day A and Day A+5, and between Day A+10 and Day A+15. According to embodiments, using the alert generation component 143 and the reporting layer 150, messages regarding these anomalies can be sent to API owners and/or API providers to apply remedies before the actual errors occur. The WMA method can be used to identify potential threats and/or failures within relatively shorter future periods (e.g., within upcoming days or weeks).

The training component 141 of the AI/ML layer 140 is trained based on historical data taken over various time periods, such as, but not necessarily limited to, one or two years. The training component may also be continuously updated based on feedback from, for example, API owners, API providers and/or clients whether error and/or rate limit predictions made by the AI/ML layer 140 were accurate.

Although shown as an element of the API management platform 110 in this embodiment, the AI/ML layer 140 in other embodiments can be implemented at least in part externally to the API management platform 110, for example, as a stand-alone server, set of servers or other type of system coupled to the network 104. For example, the AI/ML layer 140 may be provided as a cloud service accessible by the API management platform 110.

The AI/ML layer 140 in the FIG. 1 embodiment is assumed to be implemented using at least one processing device. Each such processing device generally comprises at least one processor and an associated memory, and implements one or more functional modules for controlling certain features of AI/ML layer 140.

The API backend layer 160 includes a plurality of API backends 161-1, 161-2, . . . 161-N (collectively "API backends 161"). As used herein, an "API backend" refers to a service layer including code corresponding to services which a frontend (e.g., API gateway) calls. For example, the API backends 161 respond to requests for access tokens, stored information and resources (see FIG. 2). In some other non-limiting examples, API backends 161 may process payments, retrieve customer information, and return the processing results to the frontend to be passed back to the clients. The API backends 161 comprise one or more backend services such as, for example, token management systems, database management systems, such as database servers for storing and retrieving data as requested by applications, third-party customer relationship management (CRM) applications providing enterprises with an interface for case and task management, and cloud environments for enterprise solutions including, for example, information management, compliance, and business-to-business (B2B) integration. In some embodiments, API backends 161 may be configured as a microservice-based software architecture are composed of multiple different fine-grained services with lightweight protocols, whereby microservices corresponding to different features of an application may be independently developed, deployed and scaled. For example, the API gateway layer 120 routes requests to the appropriate microservice, and may process a client request by invoking multiple microservices from one or more API backends 161 and compile the results.

Although shown as elements of the API management platform 110, the API gateway layer 120, data capture layer 130, AI/ML layer 140, reporting layer 150, API backend layer 160 and/or automated remedial processing layer 170 in other embodiments can be implemented at least in part externally to the API management platform 110, for example, as stand-alone servers, sets of servers or other types of system coupled to the network 104. For example, the API gateway layer 120, data capture layer 130, AI/ML layer 140, reporting layer 150, API backend layer 160 and/or automated remedial processing layer 170 may be provided as cloud services accessible by the API management platform 110.

The API gateway layer 120, data capture layer 130, AI/ML layer 140, reporting layer 150, API backend layer 160 and/or automated remedial processing layer 170 in the FIG. 1 embodiment are each assumed to be implemented using at least one processing device. Each such processing device generally comprises at least one processor and an associated memory, and implements one or more functional modules for controlling certain features of the API gateway layer 120, data capture layer 130, AI/ML layer 140, reporting layer 150, API backend layer 160 and/or automated remedial processing layer 170.

At least portions of the API management platform 110 and the components thereof may be implemented at least in part in the form of software that is stored in memory and executed by a processor. The API management platform 110 and the components thereof comprise further hardware and software required for running the API management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the API gateway layer 120, data capture layer 130, AI/ML layer 140, reporting layer 150, API backend layer 160, automated remedial processing layer 170 and other components of the API management platform 110 in the present embodiment are shown as part of the API management platform 110, at least a portion of the API gateway layer 120, data capture layer 130, AI/ML layer 140, reporting layer 150, API backend layer 160, automated remedial processing layer 170 and other components of the API management platform 110 in other embodiments may be implemented on one or more other processing platforms that are accessible to the API management platform 110 over one or more networks. Such components can each be implemented at least in part within another system element or at least in part utilizing one or more stand-alone components coupled to the network 104.

It is assumed that the API management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the API gateway layer 120, data capture layer 130, AI/ML layer 140, reporting layer 150, API backend layer 160, automated remedial processing layer 170 and other components of the API management platform 110, and the elements thereof can each be implemented in the form of one or more LXCs running on one or more VMs. Other arrangements of one or more processing devices of a processing platform can be used to implement the API gateway layer 120, data capture layer 130, AI/ML layer 140, reporting layer 150, API backend layer 160 and automated remedial processing layer 170, as well as other components of the API management platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the API management platform 110 to reside in different data centers. Numerous other distributed implementations of the API management platform 110 are possible.

Accordingly, one or each of API gateway layer 120, data capture layer 130, AI/ML layer 140, reporting layer 150, API backend layer 160, automated remedial processing layer 170 and other components of the API management platform 110 can each be implemented in a distributed manner so as to comprise a plurality of distributed components implemented on respective ones of a plurality of compute nodes of the API management platform 110.

It is to be appreciated that these and other features of illustrative embodiments are presented by way of example only, and should not be construed as limiting in any way.

Accordingly, different numbers, types and arrangements of system components such as the API gateway layer 120, data capture layer 130, AI/ML layer 140, reporting layer 150, API backend layer 160, automated remedial processing layer 170 and other components of the API management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the API management platform can be offered to cloud infrastructure customers or other users as part of FaaS, CaaS and/or PaaS offerings.

Figure 6:
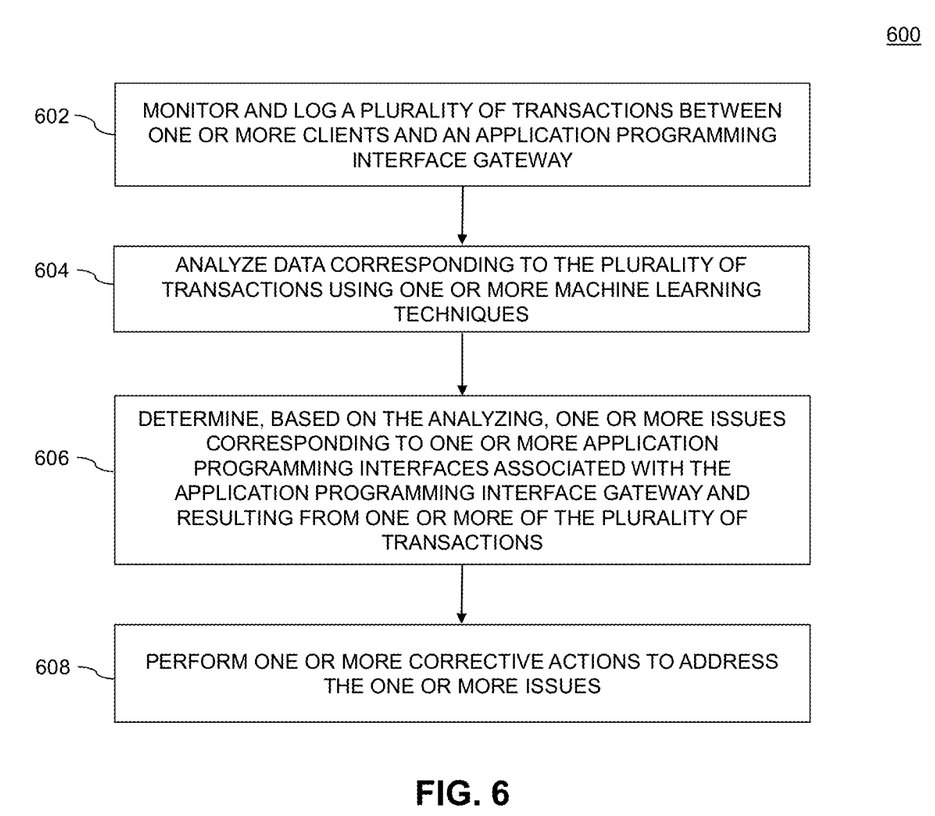
FIG. 6 is a flow diagram of a process for utilizing machine learning to predict API use patterns and identify abnormalities in an illustrative embodiment.

The operation of the information processing system 100 will now be described in further detail with reference to the flow diagram of FIG. 6. With reference to FIG. 6, a process 600 for utilizing machine learning to predict API use patterns and identify abnormalities as shown includes steps 602 through 608, and is suitable for use in the system 100 but is more generally applicable to other types of information processing systems comprising an API management platform configured for utilizing machine learning to predict API use patterns and identify abnormalities.

In steps 602 and 604, a plurality of transactions between one or more clients and an API gateway are monitored and logged, and data corresponding to the plurality of transactions is analyzed using one or more machine learning techniques. The one or more machine learning techniques comprise at least one of an isolation forest model, a weighted moving average method, an artificial neural network, a support vector machine, a K-means method, a decision tree, a multilayer perceptron, a naïve Bayes classifier, a Bayesian network and instance based learning. According to embodiments, the plurality of transactions comprise requests by the one or more clients to access the one or more APIs associated with the API gateway.

At step 606, the process 600 further includes determining, based on the analyzing, one or more issues corresponding to one or more APIs associated with the API gateway and resulting from one or more of the plurality of transactions. The one or more issues may comprise a determination that a rate limit for a given API of the one or more APIs will be exceeded. Determining the one or more issues may comprise identifying one or more anomalies by specifying a threshold value in a contamination parameter, and/or predicting one or more patterns over a future time period based on historical data.

In step 608, one or more corrective actions are performed to address the one or more issues. Performing the one or more corrective actions may comprise transmitting a message to an owner of the given API indicating that the rate limit will be exceeded, and/or performing an automated platform scaling to compensate for the rate limit being exceeded. The determination that the rate limit will be exceeded may be based on an analysis of the one or more of the plurality of transactions over a given time period to determine a trend.

The one or more issues may also comprise an internal server error. Performing the one or more corrective actions may comprise performing an automated remedial process to eliminate the internal server error.

The one or more issues may also comprise at least one spike in one or more errors, wherein the one or more errors comprise at least one of a bad request error and an unauthorized error. The process may include determining, based on the at least one spike in errors, whether one of a distributed denial of service attack and a brute force attack is occurring.

Performing the one or more corrective actions may also comprise generating a service ticket corresponding to the one or more issues, and transmitting the service ticket to a provider of the one or more APIs corresponding to the one or more issues.

It is to be appreciated that the FIG. 6 process and other features and functionality described above can be adapted for use with other types of information systems configured to execute API management services on an API management platform or other type of processing platform.

The particular processing operations and other system functionality described in conjunction with the flow diagram of FIG. 6 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an API management platform as disclosed herein can provide a number of significant advantages relative to conventional arrangements. For example, one or more embodiments are configured to use machine learning in connection with the prediction of failures or external attacks to enhance platform protection for API gateways.

Advantageously, the embodiments leverage machine learning techniques to identify future abnormalities in an API management platform based on current trends, and alert appropriate parties of the abnormalities and/or institute automated remedial processes to obviate and/or compensate for the identified abnormalities before an enterprise is impacted.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the API management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an API management platform in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
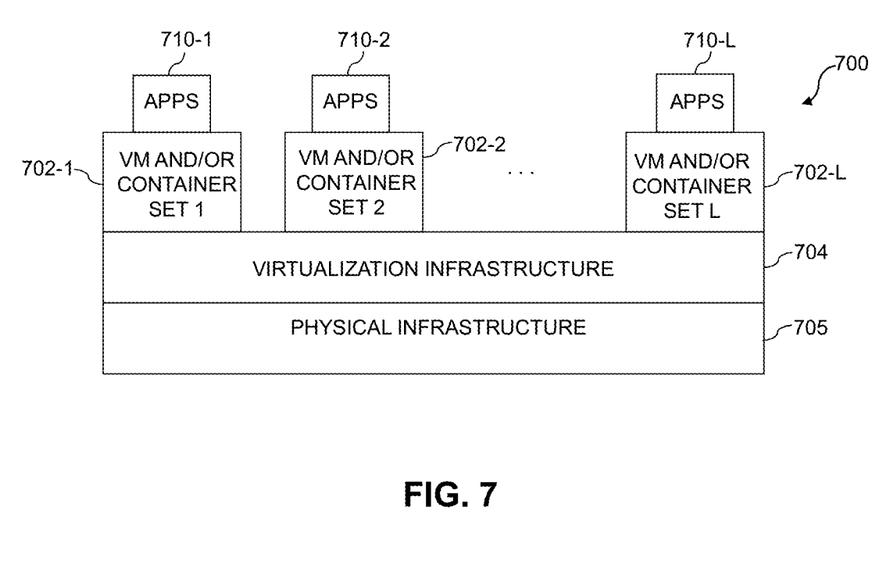
FIGS. 7 and 8 show examples of processing platforms that may be utilized to implement at least a portion of an information processing system in illustrative embodiments.
Figure 8:
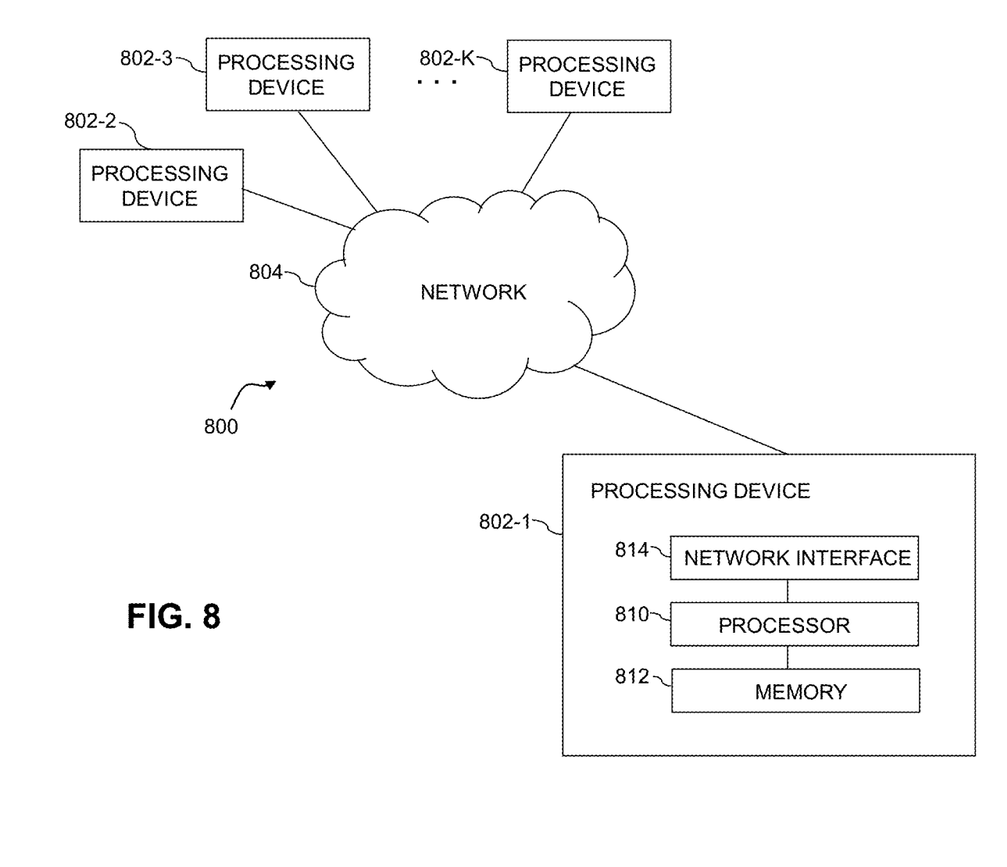

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the API management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and API management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to monitor and log a plurality of transactions between one or more clients and an application programming interface gateway;
to analyze data corresponding to the plurality of transactions using one or more machine learning techniques;
to determine, based on the analyzing, one or more issues corresponding to one or more application programming interfaces associated with the application programming interface gateway and resulting from one or more of the plurality of transactions; and
to perform one or more corrective actions to address the one or more issues;
wherein the one or more issues comprise a determination that a rate limit for a given application programming interface of the one or more application programming interfaces will be exceeded; and
wherein the determination that the rate limit will be exceeded is based at least in part on an analysis of a number of the one or more of the plurality of transactions over a given time period.

2. The apparatus of claim 1 wherein, in performing the one or more corrective actions, said at least one processing platform is configured to transmit a message to an owner of the given application programming interface indicating that the rate limit will be exceeded.

3. The apparatus of claim 1 wherein, in performing the one or more corrective actions, said at least one processing platform is configured to perform an automated platform scaling to compensate for the rate limit being exceeded.

4. The apparatus of claim 1 wherein the determination that the rate limit will be exceeded is based on an analysis of the one or more of the plurality of transactions over a given time period to determine a trend.

5. The apparatus of claim 1 wherein the one or more issues comprise at least one spike in one or more errors.

6. The apparatus of claim 5 wherein the one or more errors comprise at least one of a bad request error and an unauthorized error.

7. The apparatus of claim 5 wherein said at least one processing platform is further configured to determine, based on the at least one spike in errors, whether one of a distributed denial of service attack and a brute force attack is occurring.

8. The apparatus of claim 1 wherein the one or more issues comprise an internal server error.

9. The apparatus of claim 8 wherein, in performing the one or more corrective actions, said at least one processing platform is configured to perform an automated remedial process to eliminate the internal server error.

10. The apparatus of claim 1 wherein, in determining the one or more issues, said at least one processing platform is configured to identify one or more anomalies by specifying a threshold value in a contamination parameter.

11. The apparatus of claim 1 wherein, in determining the one or more issues, said at least one processing platform is configured to predict one or more patterns over a future time period based on historical data.

12. The apparatus of claim 1 wherein the one or more machine learning techniques comprise at least one of an isolation forest model, a weighted moving average method, an artificial neural network, a support vector machine, a K-means method, a decision tree, a multilayer perceptron, a nave Bayes classifier, a Bayesian network and instance based learning.

13. The apparatus of claim 1 wherein, in performing the one or more corrective actions, said at least one processing platform is configured:
to generate a service ticket corresponding to the one or more issues; and
to transmit the service ticket to a provider of the one or more application programming interfaces corresponding to the one or more issues.

14. The apparatus of claim 1 wherein the plurality of transactions comprise requests by the one or more clients to access the one or more application programming interfaces associated with the application programming interface gateway.

15. The apparatus of claim 1 wherein the one or more corrective actions comprises increasing resources associated with said at least one processing platform to accommodate an increase in the rate limit for the given application programming interface.

16. A method comprising:
monitoring and logging a plurality of transactions between one or more clients and an application programming interface gateway;
analyzing data corresponding to the plurality of transactions using one or more machine learning techniques;
determining, based on the analyzing, one or more issues corresponding to one or more application programming interfaces associated with the application programming interface gateway and resulting from one or more of the plurality of transactions; and
performing one or more corrective actions to address the one or more issues;
wherein the one or more issues comprise a determination that a rate limit for a given application programming interface of the one or more application programming interfaces will be exceeded;
wherein the determination that the rate limit will be exceeded is based at least in part on an analysis of a number of the one or more of the plurality of transactions over a given time period; and
wherein the method is performed by at least one processing platform comprising at least one processing device comprising a processor coupled to a memory.

17. The method of claim 16 wherein the one or more corrective actions comprises increasing resources associated with said at least one processing platform to accommodate an increase in the rate limit for the given application programming interface.

18. The method of claim 16 wherein the one or more issues comprise at least one spike in one or more errors.

19. A computer program product comprising a non-transitory processor-readable storage medium having stored therein program code of one or more software programs, wherein the program code when executed by at least one processing platform causes said at least one processing platform:
to monitor and log a plurality of transactions between one or more clients and an application programming interface gateway;
to analyze data corresponding to the plurality of transactions using one or more machine learning techniques;
to determine, based on the analyzing, one or more issues corresponding to one or more application programming interfaces associated with the application programming interface gateway and resulting from one or more of the plurality of transactions; and to perform one or more corrective actions to address the one or more issues;

wherein the one or more issues comprise a determination that a rate limit for a given application programming interface of the one or more application programming interfaces will be exceeded; and wherein the determination that the rate limit will be exceeded is based at least in part on an analysis of a number of the one or more of the plurality of transactions over a given time period.

20. The computer program product of claim 19 wherein the one or more corrective actions comprises increasing resources associated with said at least one processing platform to accommodate an increase in the rate limit for the given application programming interface.

* * * * *